March 22, 1927.    1,622,185
F. G. DEWEY
MANUFACTURE OF ARMATURES
Filed Oct. 16, 1924    6 Sheets-Sheet 1

Inventor
F. G. Dewey
By Spencer Serrell and Hardman
Attorneys

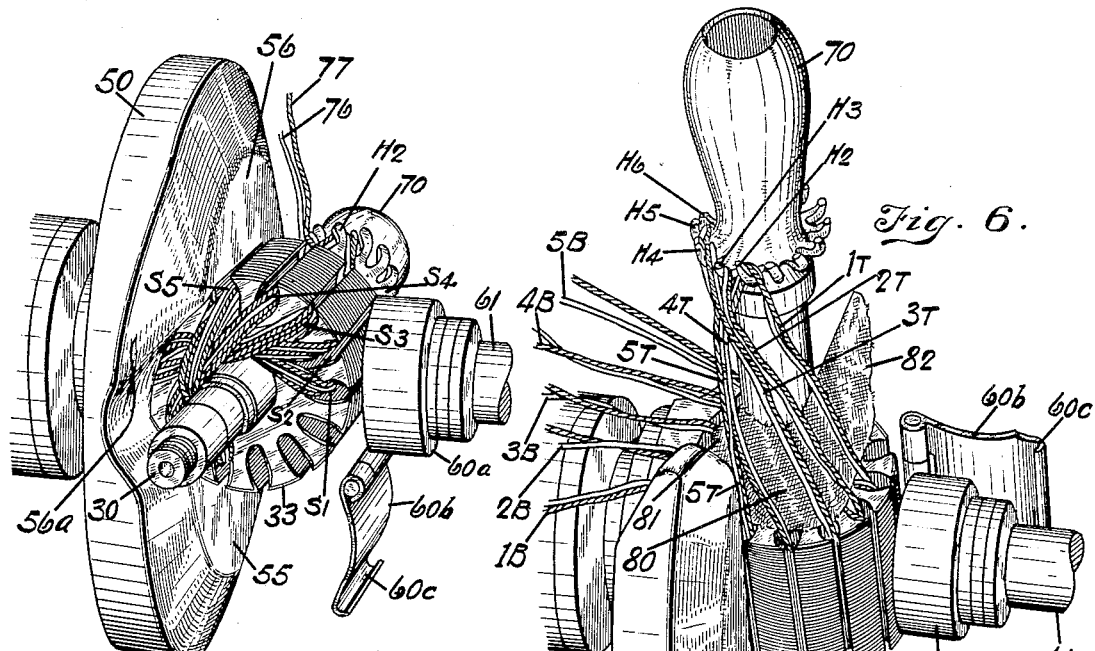
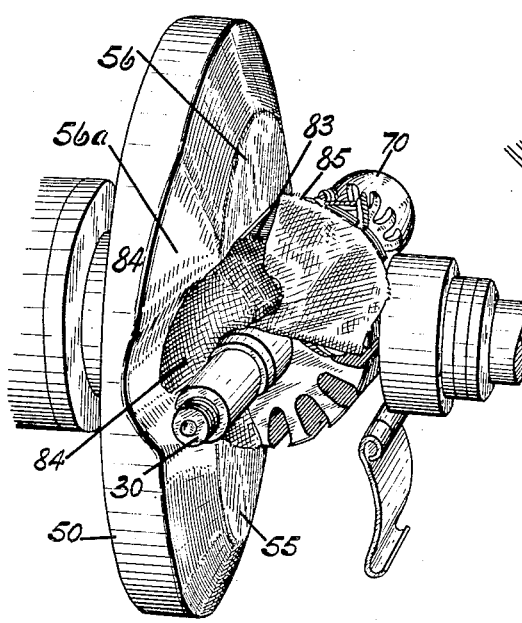
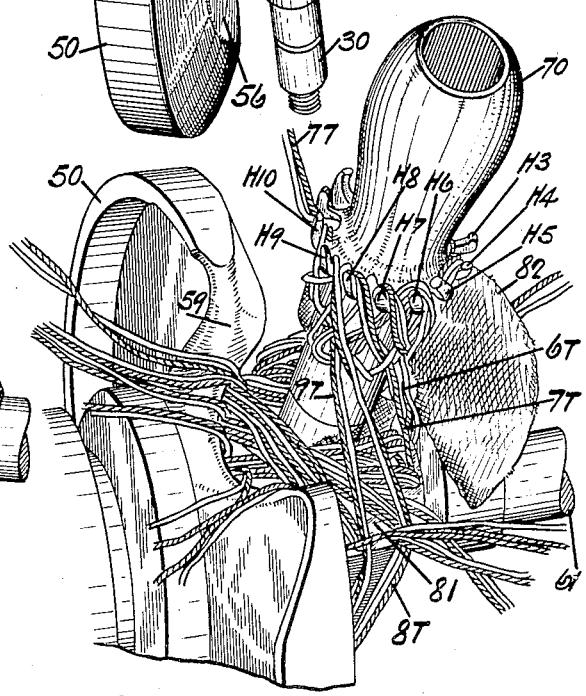

March 22, 1927. 1,622,185

F. G. DEWEY

MANUFACTURE OF ARMATURES

Filed Oct. 16, 1924 6 Sheets-Sheet 3

Inventor

F. G. Dewey

By Spencer Duvall and Hardman

Attorneys

March 22, 1927.

F. G. DEWEY 1,622,185

MANUFACTURE OF ARMATURES

Filed Oct. 16, 1924

Inventor

F. G. Dewey

By Spencer Sewall and Hardman

Attorneys

Patented Mar. 22, 1927.

1,622,185

UNITED STATES PATENT OFFICE.

FRED G. DEWEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MANUFACTURE OF ARMATURES.

Application filed October 16, 1924. Serial No. 743,973.

This invention relates to the winding of armatures having open slotted cores, and one of the objects is to wind the armature coils in a manner such that the leads or terminals of the coils will emerge as near as possible to the periphery of the core so that, in the connection of these leads to the commutator bars, abrupt bends in the leads and the crossing of a lead at right angles to the wires of a coil adjacent the end of the core, and consequent injury to the insulation of the coils and leads can be avoided.

A further object of this invention is to improve the manner of insulating the overlapping portions of the armature coils so as to reduce short circuits, and reduce the number of insulating pieces required.

Further objects and advantages of the present invention will be apparent from the following description, reference being had to the accompanying drawings, wherein a preferred embodiment of one form of the present invention is clearly shown.

In the drawings:

Figs. 1 to 11 are perspective views showing different stages of a winding process embodying the present invention;

Figs. 16 and 17 are armature winding diagrams showing the method of forming loops between successive coils and cutting the loops to provide coil leads or terminals.

Figure 1:
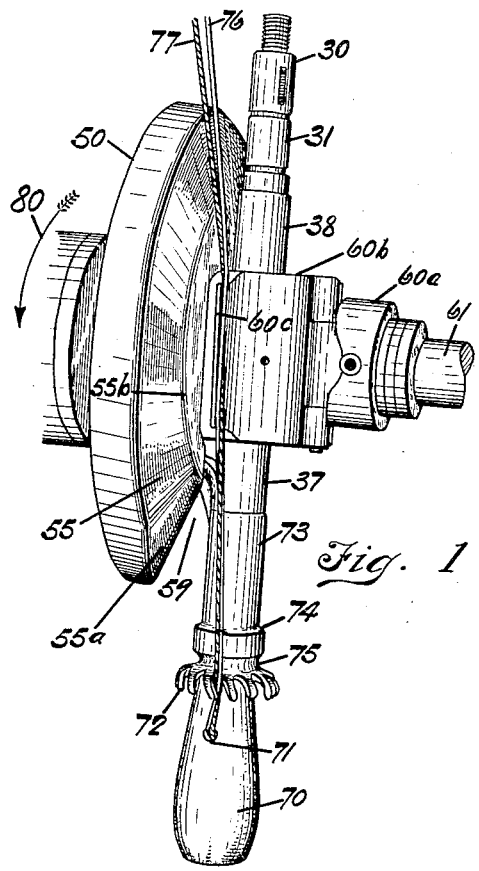

The disclosed embodiment of the present invention is applied to the particular armature and winding machine disclosed in the copending application of Albert B. Gomory, Serial No. 751,183, filed November 20, 1924, but it is to be understood that the present invention may be applied to the winding of other open slotted armature cores, with such modifications as will be readily apparent to those skilled in the art.

Referring to the drawings, the armature includes a shaft 30 having journals 31, and a laminated core 33 providing winding slots $S_1$, $S_2$, $S_3$, etc. Each end of the core is provided with an insulating disc 36 of the same contour as the laminations 34. Adjacent discs 36, shaft 30 carries insulating tubes 37 and 38, respectively.

Figure 13:
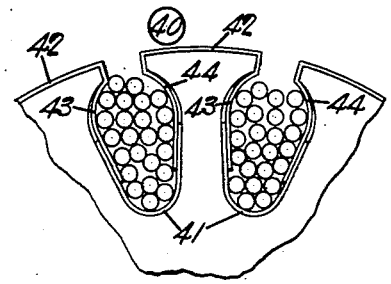
Figs. 13 and 14 are fragmentary end views of the core and slot insulations, on an enlarged scale.
Figure 14:
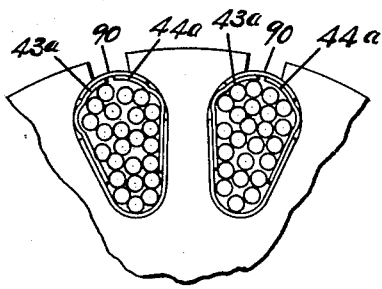

Referring to Figs. 13 and 14, the core slots are lined with insulating V-strips 41 and with the branches 43 and 44 insulating V-strips 40, the yokes 42 of the V-strips 40 being initially located over the periphery of the core teeth.

Winding of the armature is performed preferably by the use of a power winding machine of the type shown in Figs. 1 to 12. This machine includes a winding head 50 mounted preferably upon a horizontally disposed spindle 51 which is driven in any suitable manner. The winding head 50 includes a cylindrical recess 54 adapted to receive the armature core 33, and diametrically opposite scoop-like portions $55^a$ and $56^a$ merging into cheeks 55 and 56. The portion $55^a$ is notched at 59 for a purpose to be described. The cheeks 55 and 56 merge with the cylindrical surface 57 of recess 54 at the edges $55^b$ and $56^b$, respectively. The edges $55^b$ and $56^b$ are angularly spaced with respect to the axis of the core 33 so that the wires 76 and 77 (to be described) will be guided into certain slots of the armature core 33 having a predetermined spacing when the core is revolved by the head 50. The spacing or pitch of the windings may be for example, seven, counting the slots into which the wires are directed and the five intervening slots. The wires 76 and 77 which are unwound from supply reels during the winding of wire upon a core, are led over guide wheels (not shown) located preferably above winding machine and at such an angle thereto that, as an end of the armature shaft approaches the wires 76 and 77, these wires will not be engaged by the shaft until after a scoop portion of the head has engaged the wires. It is evident that as the head 50 revolves as indicated by arrow 80 in Fig. 1, the scoop portion $55^a$ will cause the wires to be packed around the insulation 37 at the commutator end of the core. The scoop portion $56^a$ will cause the wires to be packed around the insulation 38 at the other end of the core. The wires 76 and 77 are held taut by a suitable tensioning device, and the minimum tension will occur when the wires are not engaged by the winding head. As the checks 55 and 56 cam the wires into the armature slots the tension will be increased due to the fact that the wires are pushed away from their normal position of inclination thus causing the unreeling of the wires to be accelerated. The tension applied to the wire will vary according to the size of wire.

It is apparent from the foregoing that the wire will be held in engagement with the scoop portions at the proper time and with the cheek portions so that the head may function properly to direct the wire into the slots. The cheek portions and the scoop portions are shaped so that there will be a substantial line of contact between the wires and the head. In this manner the pressure between the wires and head will be distributed over a substantial portion of the wire so that the pressure applied to the wire by the head at any point of contact will not be sufficient to injure the insulation of the wire. For example, the line of contact between the wire and cheek 55 extends from the edge 55$^b$ (in Fig. 1) to the periphery of the head.

Figure 12:
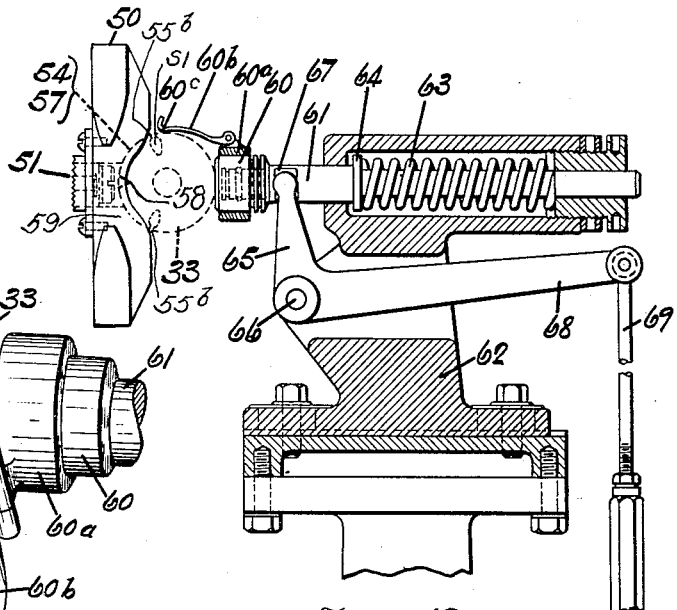
Fig. 12 is a fragmentary side view, partly in section, showing the winding apparatus.

Referring to Fig. 12, the armature core is maintained upon the winding head by means of a presser block 60 which is rotatably mounted on a rod 61 slidably supported by frame 62. A spring 63, bearing at one end against frame 62 and at the other against a collar 64 carried by rod 61, yieldingly presses the block 60 against the armature core. A lever 65 fulcrumed at 66 is connected at 67 with rod 61. By moving the free end 68 of the lever down, preferably by a pedal (not shown) connected with a strap 69 the block 60 may be withdrawn from the armature core to permit withdrawal of the core from the winding head.

The cylindrical portion 57 of the head 50 which defines the bottom of the recess 54, is provided with an indexing lug 58 adapted to project into that slot of the armature core which is midway between the slots which are located adjacent the cheeks 55 and 56. In starting the winding operation the slot S1 for receiving coil No. 1, will be aligned with cheek 55 while slot S9 will be aligned with cheek 56. When the armature is properly located within the recess 54, the lug 58 will extend in the slot S12. As the armature coils are successively wound on the core, slots S2, S3, S4, etc., will be brought into alignment with the cheek 55, and the lug 58 will be progressively received by the slots S13, S14, S1, etc., respectively, as will appear hereinafter.

The winding machine thus far described is one which may be employed in the winding process disclosed in application Serial No. 751,183, referred to. The additional apparatus required to carry out the method of the present invention includes a ring 60$^a$ secured to presser head 60, and a hook plate 60$^b$ pivotally attached to the ring 60$^a$ and having a flange providing a hook 60$^c$.

Figure 15:
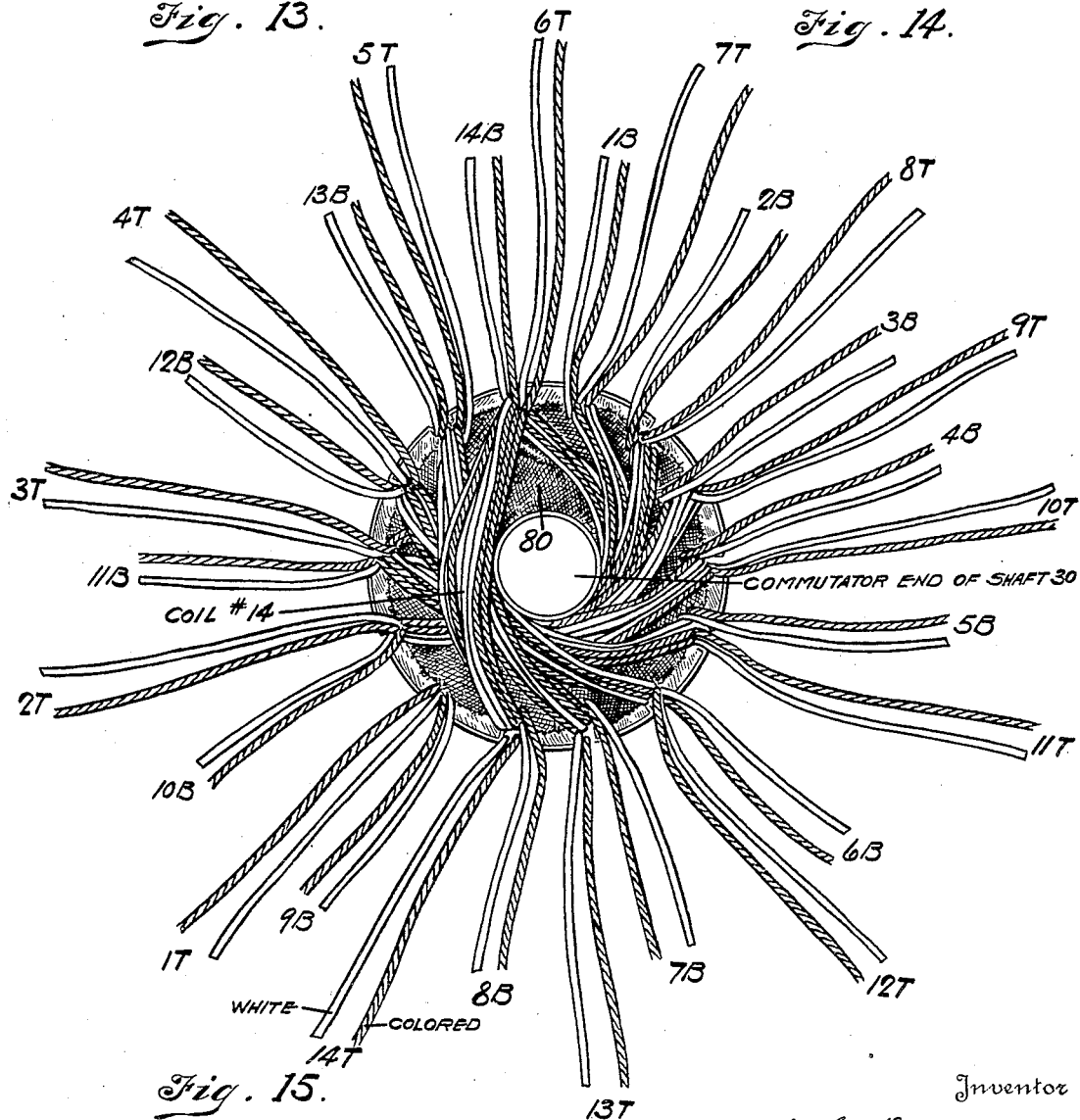
Fig 15 is an end view of a completely wound armature core.

In the particular example given, a white insulated wire 76 and a wire 77 having colored insulation are unwound simultaneously from supply reels and are wound upon the core in a manner to be described. The resulting product is an armature having, as shown in Fig. 15, all of its leads emerging from the commutator end of the core as near as possible to the periphery of the core. The beginning or start leads 1B, 2B, etc., are cut off a less distance from the core than the top or end leads 1T, 2T, etc. By color and length, the different leads are readily distinguished so that they may be properly connected with the commutator bars. In Fig. 15, the 14th or last coil is readily distinguished since it overlaps all the other coils. The other start and end leads follow in regular order from 14B and 14T, respectively.

In order to produce the desired results, the wires joining the progressively wound armature coils are formed into loops, and these loops are severed in two places differing in distance from the armature core whereby to make the end terminals or leads from armature coils longer than the start leads. Between successive winding operations some of these leads are bent away from the region of winding of the coils so that the overlapping portions of the coils cannot push the previously formed coil terminals down against the insulating tube 37. In other words, the winding must proceed in such a way that the coil terminals can be brought out alongside the insulation disc 36, and so as not to be pressed down by the successive coil winding operations against the tube 37.

In order to facilitate this process of winding, there is provided a handle 70 which is provided with a central bore adapted to fit over the commutator end of the armature shaft. The handle is provided with a hole 71 and with a plurality of hooks 72 each extending toward the operator who is on the same side of the machine as the handle 70 in Figs. 1, 2, 3, 4, 6, 8 and 10. The drawings show a handle having 14 hooks, one for each of the 14 slots of the armature core which has been selected as an example to illustrate the winding process. The handle includes a sleeve 73 having an internal diameter sufficient to receive that portion of the armature below the armature insulation 37, as shown in Fig. 1, but the internal diameter of the sleeve 73 is less than the external diameter of insulation 37 so that this insulation acts as a stop to limit the movement of the handle 70 toward the armature core. The sleeve is provided with a shoulder 74 which serves as a guide for the blades of a pair of wire snippers so that the start leads extending from the first turns of the coils will all be severed off a uniform distance from the armature core. The sleeve 73 is provided with a groove 75 which serves as a guide for the snipper blades to facilitate cutting off the end leads at a uniform distance from the armature core and so that the end leads will be longer, as measured from the core, than the start leads.

Figure 2:
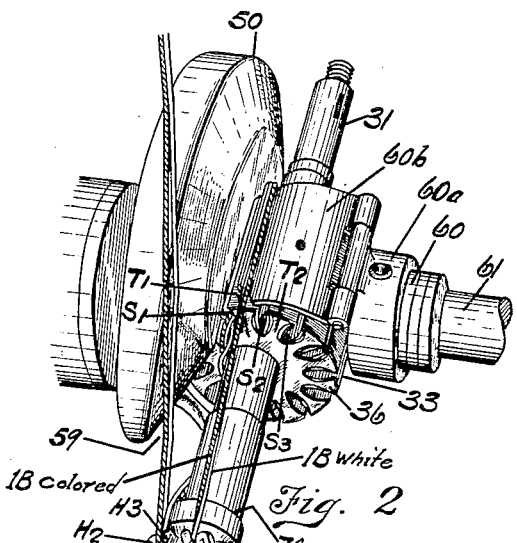
Figure 3:
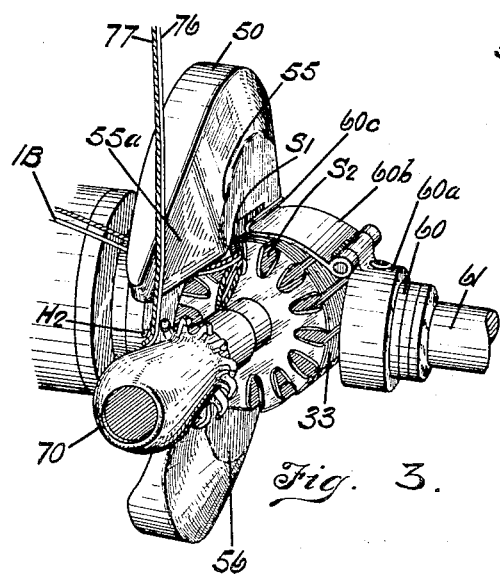

Figs. 1, 2 and 3 show the manner of winding the first coil. The core 33 is placed between the head 50 and presser block 60 with the commutator end of the shaft 30 extending toward the operator. The hook tool 70 is assembled upon the commutator end of the shaft 30. The ends of the wires 76 and 77 leading from the supply reels and wire guiding pulleys, not shown, are first temporarily attached to the tool 70 by passing their ends through the hole 71 and pulling them out through the hollow handle as shown in Fig. 2. These wires will be crimped adjacent the hole 71 sufficiently to connect the wires and tool 70. Before rotating the head 50, the wires 76 and 77 are placed upon the hook plate $60^b$ and within the hook $60^c$, as shown in Fig. 1. The head 50 is rotated in the direction of the arrow 80 in Fig. 1, until the desired number of turns have been wound upon the core. Fig. 2 shows the armature at the end of this step in the process. Next, the ends of the first coils on, marked 1B white and 1B colored are severed adjacent the shoulder 74 of tool 70. These ends lead from the starting active coil sides of the first turns which have hitherto been kept out of the winding slot S1 by placing them in the hook $60^c$. After severing these ends as stated, these starting active coil sides are then placed in slot S1, and the leads thereof, marked 1B in Fig. 3, are pulled away from the zone of winding of the succeeding coils by bending these leads into notch 59 of the head 50. The wires 76 and 77 are then brought around hook $H_2$ as shown in Fig. 3.

Figure 4:
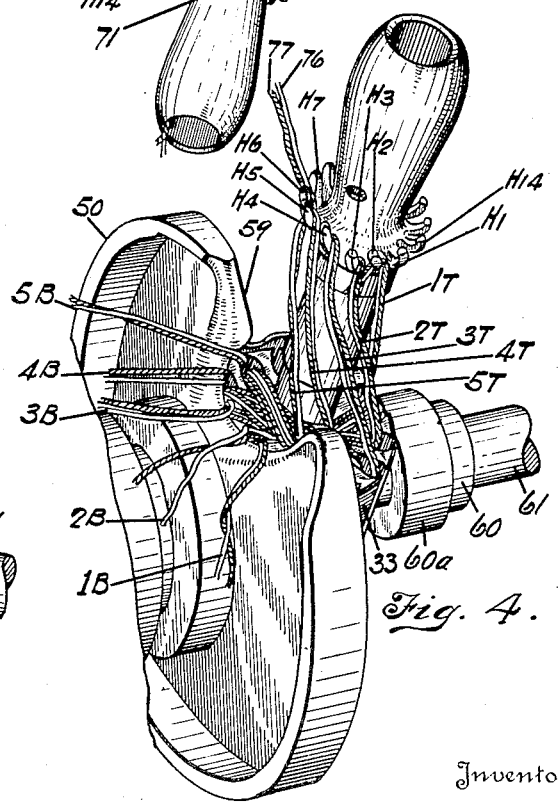
Figure 9:
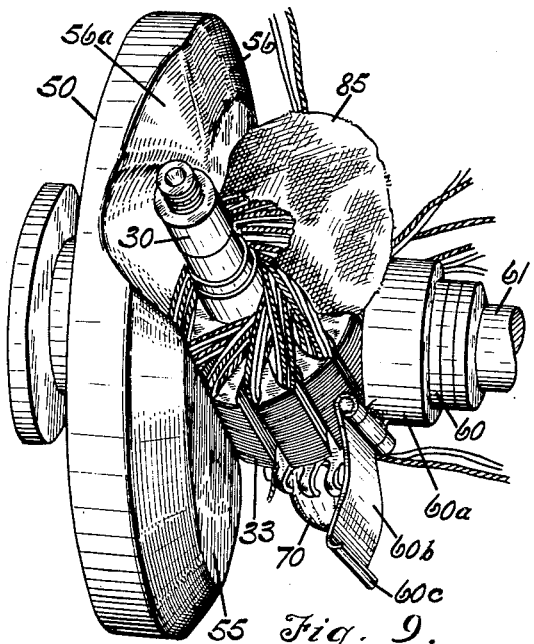

Before winding the second pair of coils and each pair of coils thereafter, the operations described in connection with the winding of the first pair of coils are repeated. More particularly, it is pointed out that the starting active coil sides of each pair of coils are kept out of the core by locating them in the hook $60^c$ of plate $60^b$ until after the winding of that pair of coils is completed. After winding a pair of coils the pair of starting active coil sides are placed upon other active coil sides, and the leads thereof are pulled through the notch 59 before winding the next pair of coils. Fig. 4 shows the armature after the first five pairs of coils have been wound on. The start leads 1B to 5B extend through the notch 59 of head 50.

To locate the core 33 in successive winding positions the block 60 is retracted by pulling down link 69 (Fig. 12), so that the core will clear the indexing lug 58. The core is turned counterclockwise (looking at the tool 70 in Fig. 3) to bring the next core slots in alignment with the cheeks of the winding head. Then link 69 is released, and spring 63 presses the block 60 against the core 33.

Figure 16:
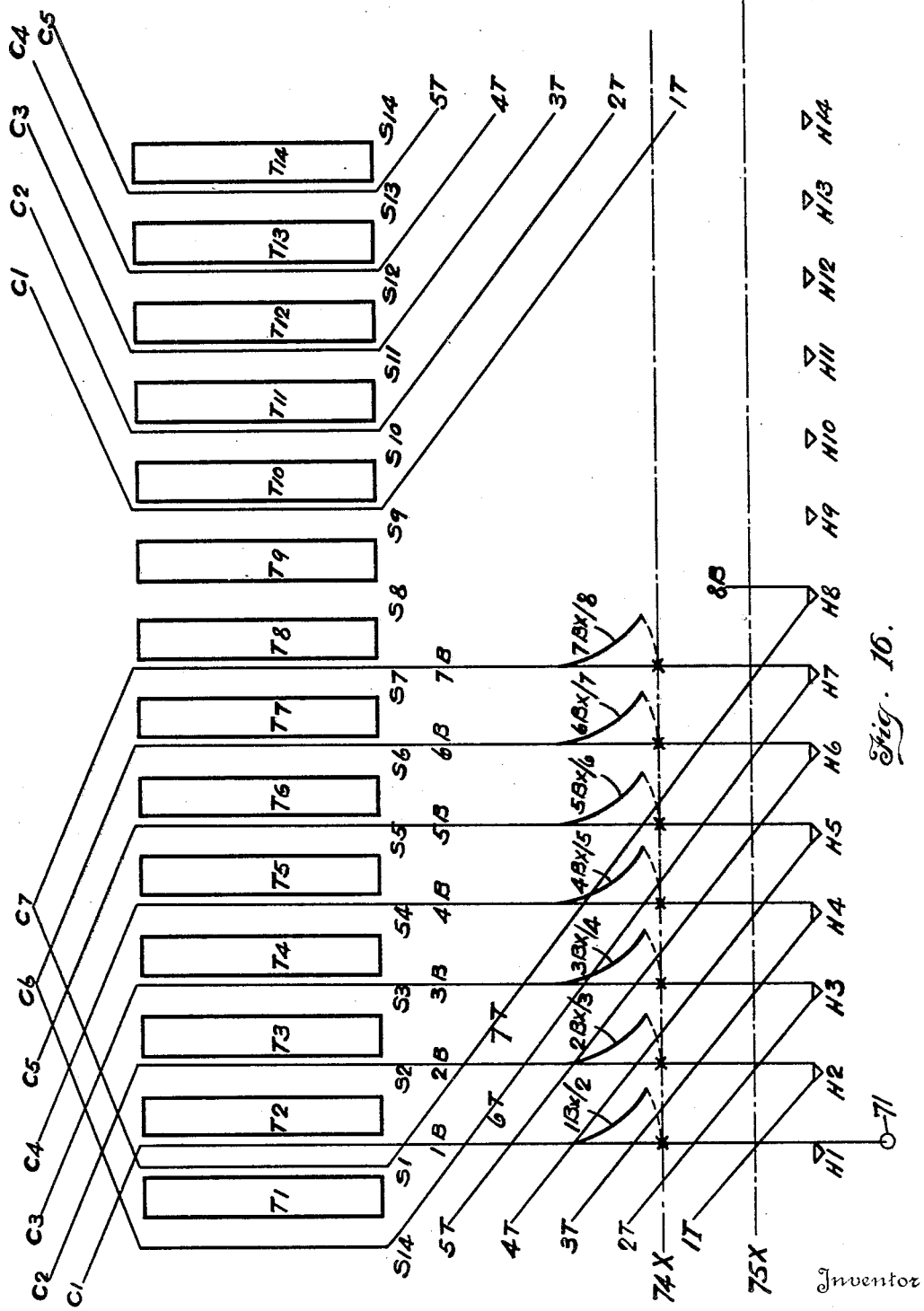

The steps of cutting the loops between successive coils to provide leads to the coils, and of bending these leads away from the winding region are shown diagrammatically in Figs. 16 and 17. In these diagrams, the white and colored wires are considered as one wire, since the process disclosed can be applied to the winding of one or more coils simultaneously. The core teeth are designated by T1 to T14, the slots are designated by S1 to S14, and the coils by C1 to C14. The start leads of the respective coils are designated by 1B to 14B, respectively, and the end leads are designated by 1T to 14T, respectively. The cutting line 74X in Figs. 16 and 17 represents the shoulder 74 shown in Fig. 1. The cutting line 75X designates the groove 75 shown in Fig. 1. The different hooks 72 shown in Fig. 1 are designated by H1 to H14 in Figs. 16 and 17, these hooks corresponding with the slots S1 to S14. It will be noted that where the lead 1B crosses the cutting line 74X, a small $x$ is placed to designate that the lead 1B is cut along the shoulder 74 of the handle 70, the heavy curve line which is designated by the symbol 1B$x$/2 means that before winding coil C2, the lead 1B is cut off along the shoulder 74 and is bent out through the notch 59 of the winding head 50. The heavy curve line designated by the symbol 2B$x$/3 denotes that before coil C3 is wound on, the bottom lead of coil C2 known as 2B is cut off along the shoulder 74 and moved out through the notch 59 so as to be overlapped by coil C3 but be positioned between coil C3 and the bore insulating disc 36. With this explanation the meaning of the symbols 3B$x$/4 to the symbol 13B$x$/14 will be readily apparent. These symbols simply mean that before coils 2 to 14 are wound on, the starting leads of coils C1 to C13 are severed, respectively. It is apparent that since coil C14 is the last one on, its starting lead 14B will not be severed until after the winding operation is complete. The symbol 14B$x$/ end is used to designate this step.

It is apparent in Fig. 1 that until the first eight coils are wound on, the ending leads of the preceding seven coils need not be clipped. But since the coil C9 enters the slot S9 in which a portion of coil C1 is contained, the ending lead of coil C1, lead 1T, must be severed and thrown out through the notch 59. Since it is desired to have the ending leads longer than the starting leads in order to distinguish them, the ending leads with the exception of 14T are severed adjacent the notch 75. Referring to Fig. 17, the points of intersection of the lines 75X with the leads 1T to 13T are designated by $x$ to denote that the ending leads are severed at the groove 75. The ending leads 1T to 7T should all be severed at the groove 75 before coil C9 is applied. Therefore the symbol 1T$x$/9 applied to the heavy curve line just below it, denotes that 1T is cut at the groove 75 and bent out of the winding region before coil C9 is applied. The curve line designated by the symbol 2T$x$/10 designates that the terminal 2T should be cut off at groove 75 and bent out of the winding region at least before winding coil C10. The terminals 7T to 14T need not be severed until the end of the winding operation. The lead 14T is not severed at the groove 75 but this terminal is cut off longer than the others in order to make it clearly distinguishable, and instead of wrapping 14T around hook 1 this lead is simply wrapped around the other leads to hold them in position after the armature is removed from the winding machine. In other words the leads are not all spread out as shown in Fig. 15 but are tucked down along the armature shaft after the handle 70 has been removed and the long lead 14T is used to hold the other leads temporarily in position.

In the particular example given, each slot will contain 24 wires since each slot contains active coil sides of two pairs of armature coils that is, two separate coils covered with colored insulation and two separate coils covered with white insulation. Each coil has six turns, therefore, there will be 24 conductors or active coil sides in each slot. This is illustrated diagrammatically in Figs. 13 and 14 by the 24 circles shown in each slot. The wires 76 and 77 are held taut preferably by applying a suitable tension device applied to each of the reels holding the supply wire. This is desirable in order that the conductors will be packed down firmly in the armature slots. This packing down of the wire causes the V strips 41 to be drawn toward the center of the core while the braches 43 and 44 of the V strips 40 are pressed toward the core teeth. If the slot lining is made of a continuous strip, there is a tendency for the slot lining to tear because there is a tendency to stretch it as the windings are pressed down into the armature slots. In the present method of slot insulation, the branches of the strips 40 and 41 may slide relative to one another so that the lining material may be packed against the sides of the slots without tearing. The strips 41 and 42 are long enough so that their ends come flush with the outer faces of the core insulating disc 36.

After the winding process the armature strips 40 are cut along the edges A and B so that the base portion 42 of each strip 40 can be discarded. The outer edges of the branch portions 43 and 44 are packed down against the armature conductors as indicated at 43$^a$ and 44$^a$ and these edges and the wires are held in position by means of strips of stiff paper 90 shown in Fig. 14. These strips are located between the armature core teeth and the folded down lining portions 43$^a$ and 44$^a$. A subsequent operation of impregnating the armature with an insulating varnish and baking will cause the lining members to adhere to one another and to the core teeth, and the tendency of the conductors to move out radially due to centrifugal force causes the strips 90 to be clamped even more firmly against the core teeth to prevent the portions 43$^a$ and 44$^a$ assuming a radial position.

The foregoing description shows generally the method employed for obtaining the results shown in Fig. 15. When the winding of armature coils has proceeded to the stage where the next coil to be wound is the first one to provide conductors which are located in a slot already occupied by a coil, the starting lead of that coil which previously occupies that slot is pulled away from the winding region of the next coil to be wound and is pulled in such a direction that its starting active coil side will be located at the side of the slot to receive a portion of the next coil and between the middle of that slot and the core periphery. Referring to the particular armature illustrated by way of example, the following steps are required after winding the first six coils in addition to the steps of cutting the loops between previously wound coils, relocating the starting active coil side and bending its lead out of the winding region of the next coil to be wound.

After six coils are wound on before beginning to wind the 7th to the 14th coils, respectively, the starting lead of the 1st to 8th coils, respectively, is pulled to the right of the operator so that it will be located out of the winding region of the next coil to be wound and so that its starting active coil side will be located at the side of the slot between the middle of the slot and the core periphery. Therefore the next coil to be wound into that slot will be located alongside of—and not upon the starting active coil side of the first coil to be wound into that slot.

When the winding of armature coils has proceeded to the stage where each slot had received at least one coil portion, before winding succeeding coils, the ending leads of coils already occupying the next slots which in turn receive coils must successively be pulled out of the winding region of the next coil to be wound and in such a direction that their ending active coil sides will be located at the side of the slots which successively receive the coils and between the middle of the slot and the core periphery.

In the example given, when eight coils have been wound each core slot will receive at least one coil, therefore the following steps are required in addition to those already given.

After winding eight coils, and before winding each of the 9th to the 14th coils, respectively, the ending leads of coils #1 to #6, respectively, are clipped at groove 75 of tool 70 and are pulled to the right of the operator and toward the upper side of the armature core so that the ending active coil sides connected with these ending leads will be located at one side of a core slot and between the middle of the slot and the core periphery.

The details of manipulating the leads of the 7th to the 14th coils are as follows:

Before winding the 7th coil, pull 1B to the right underside of the core. After winding the 7th coil, insert 7B in slot S7 and pull left through notch 59.

Before winding the 8th coil, pull 2B to the right underside. After winding the 8th coil insert 8B in slot S8 and pull left through notch 59.

Before winding the 9th coil, pull 3B to the right underside, and clip 1T and pull to the right and toward upperside of the core. After winding the 9th coil, insert 9B in slot S9 and pull left through notch 59. Pull 1T to the left.

Before winding the 10th coil, pull 4B to the right underside, and clip 2T and pull to the right and toward the upperside of the core. After winding the 10th coil, insert 10B in slot S10 and pull left through notch 59. Pull 2T to the left.

The manipulations of coil leads before and after winding the 11th to the 14th coils are apparent from the detailed description of the manipulations for the 9th and 10th coil winding operations.

After the 14 coils are wound, the ends of the 7th to the 13th coils are clipped at groove 75 and the lead 14T is cut longer than the others and used to bundle the other leads with the armature shaft. Then the armature may be removed from the winding machine and the hook tool 70 from shaft 30.

Figure 10:
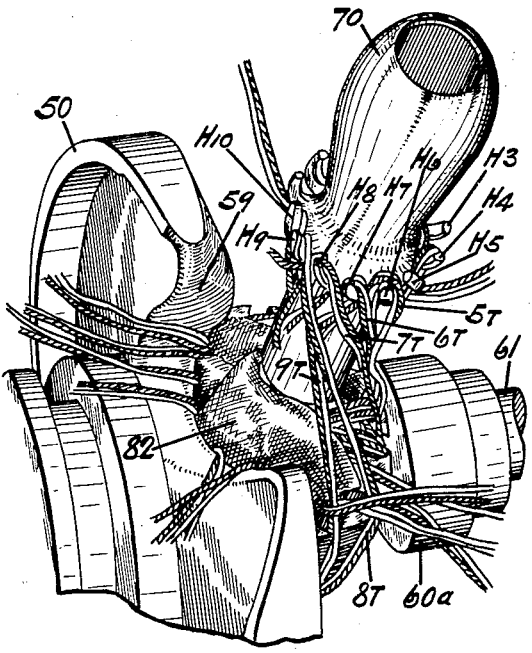
Figure 11:
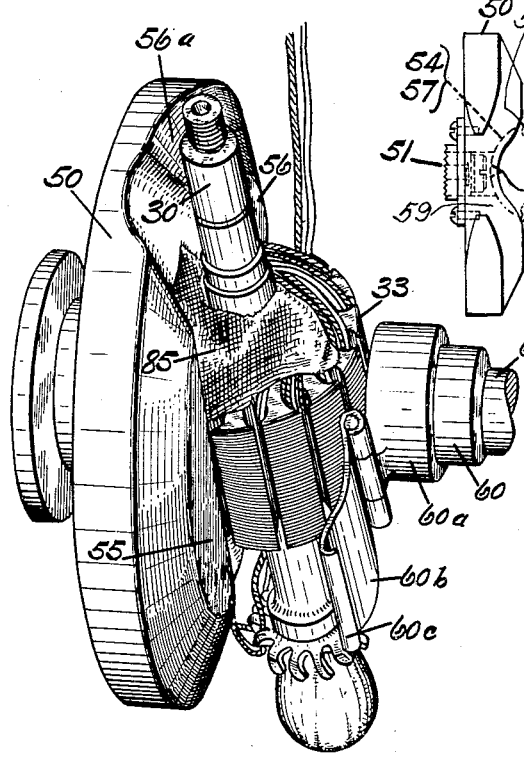

The method of insulating the overlapping portions of the coils is shown by Figs. 6 to 11. After winding five coils, a fabric washer 80, slit radially from periphery to the center hole is placed as shown in Fig. 6 with the flap 81 thereof against the overlapping coil portions at the commutator end of core 33 which appear in Fig. 4. A similar washer 83 is placed around the end of the shaft 30 remote from the commutator end, and a flap 84 thereof is placed as shown in Fig. 7 against the overlapping coil portions which appear in Fig. 5. During the winding of the 6th to the 9th coils inclusive, the flaps 82 and 85 of washers 80 and 81, respectively, are kept out of the winding region. Two views of the armature after winding the 9th coil are shown in Figs. 8 and 10. Before further winding, the flaps 82 and 85 are placed against the overlapping portions of the coils as shown in Figs. 10 and 11, respectively. The winding of the 10th to the 14th coils causes the insulating washer flaps to be secured in position. By means of the two insulating washers, overlapping layers which would lie at substantially right angles to preceding layers at the ends of the core are insulated, thereby minimizing the possibility of short circuits between wires crossing at right angles.

The cutting and manipulation of the coil leads between successive coil winding operations results in the leads emerging from the coils as near as possible to the periphery of the coil. For example, attention is directed to the relation shown in Fig. 15 of leads 6T and 14B and the relation of leads 8B and 14T. The active coil side of lead 6T lies alongside coil 14 and almost as near to the periphery of the core as the active coil side of the lead 14B. The active coil side of lead 8B lies alongside coil 14. This is the result of placing the active coil side of the lead 8B in the core slot after winding coil #8, and of pulling lead 6T upward and to the right of the operator (right in Fig. 15) and of pulling lead 8B to the right of the operator before winding the 14th coil.

It is therefore apparent that the present invention includes broadly keeping the starting active coil side out of the core until its coil is completely wound into the core, and in bending leads of previously wound coils out of the winding region and in such direction that the coil which is subsequently wound into the core slots partly occupied by such previously wound coils will lie alongside the active coil sides of previously wound coils. In this way, the leads and active coil sides immediately contiguous will not be buried by subsequently wound coils, and said leads will emerge from the windings relatively near to the core periphery. This method of manufacture is conducive to economy since it avoids the use of the space usually required between the commutator and the windings for bringing out the leads from under the overlapping portions of the windings. In joining the leads to the commutator, no abrupt bends in the leads are necessary. Hence the amount of insulation required in addition to the wire insulation for the purpose of preventing short circuits where abrupt bends occur has been reduced.

Summary.

The winding process and apparatus of the present invention may be applied to the winding of armatures having a number of core slots and a winding pitch differing from the example given. In the following summary of manipulations required for the winding of various armature cores, S is the number of core slots, T, the number of core teeth embraced by a coil, and N, the winding order number of the coil.

(a) In every case before winding a coil keep the start or bottom active coil side out of the core, and after that coil is wound and before winding the next coil, clip the previously formed loop at shoulder 74 place the starting active coil side in the slot adjacent the winding head, and pull its lead away from the winding region preferably by pulling it through notch 59 of head 50.

(b) When T coils are wound, and before winding the succeeding coils, beginning with the first coil starting lead pull the starting leads of previous wound coils away from the winding region and in a direction such that their respectively starting active coil sides will be pulled to the side of and near the mouth of the core slot. Generally stated, before winding the (T+N)th coil pull the starting lead of the Nth coil away from the winding region. The (T+1)th coil is the first one to occupy a slot in common with a previously wound coil, hence it is necessary to keep the starting active coil side of that coil in a position where it will not be buried under the subsequent coil.

(c) In addition to the steps mentioned in (a) and (b) of the summary, after S—T coils are wound and all slots then have at least one winding, begin to clip the ending leads of previously wound coils progressively, beginning with the first coil. Generally stated, before the (N+S—T)th coil is wound, clip the Nth ending lead and pull away from the winding region and toward one side of and the mouth of the slot, so that the next coil to occupy that slot will not bury said Nth ending active coil side. After winding the (N+S—T)th coil, pull the Nth coil out of the region of winding of the next coil to be wound.

While the method and apparatus described constitutes a preferred form of the present invention, it is to be understood that other forms might be adopted, all coming within the scope of the claims which follow.

What is claimed is as follows:

1. The method of winding coils progressively into spaced slots of an armature core which includes so winding the first turn of a coil about the core that the starting active coil side is located upon the periphery of the core while the other active coil side of the first turn is located within a core slot, then winding the other turns of a coil so that both active coil sides of these other turns will be located in core slots, and then placing the starting active coil side upon the other coil sides in a certain slot so that the coil leads will emerge from the respective starting and ending active coil sides substantially the same distance from the periphery of the core.

2. The method of winding an armature which includes the steps defined by claim 1, and the additional step which is introduced before succeeding coil winding operations beginning after each core slot has received a portion of an armature coil, and which consists in pulling the starting or ending active coil sides of previously wound coils toward the side walls of the slots which receive the coils before other coils are wound into said slots in order that the starting or ending active coil sides of the inner coils will lie alongside active portions of the outer coils, and so that the leads from these active coil sides of inner coils will not be buried underneath overlapping end portions of the outer coils.

3. The method of winding coils progressively into spaced slots of an armature core which includes the steps defined by claim 1 employed in conjunction with steps including forming a loop between successive coils, said loop including the ending lead of a preceding coil and the starting lead of a succeeding coil said starting lead joining the starting active coil side which has been located temporarily along the periphery of the core until after the remainder of the coil has been wound; cutting the loop to free this start lead and to permit placing its starting active coil side within a slot and upon the remaining turns of the coil; the bending of this start lead away from the winding region of the next coil to be wound in order that this lead will not be overlapped by the next coil; and which method includes in addition to the foregoing the following step which is introduced after the winding has progressed to the stage where the next coil to be wound would occupy a slot containing a previously wound coil portion, namely, the starting lead emerging from said slot is pulled away from the winding region of the next coil to be wound and in a direction such that its contiguous starting active coil side will be located against the side of the slot and between the middle of the slot and the core periphery; and which method includes in addition to the foregoing the following step which is introduced after the winding has progressed to the stage where each slot has received at least one coil, namely pulling the ending lead of a coil already occupying a slot next to receive a coil away from the winding region of the next coil to be wound and in such a direction that its contiguous ending active coil side will be located at the side of the slot next to receive a coil and between the middle of the slot and the periphery of the core.

4. An armature comprising, in combination, a slotted armature core and a plurality of coils wound into slots of the core, the starting active coil side of each coil being located within a certain core slot and upon other active coil sides in said slot, the start lead of each coil emerging from the core substantially as near to the core periphery as the ending lead of the coil.

5. An armature comprising, in combination, a slotted armature core and a plurality of coils wound into slots of the core, each core slot receiving active coil sides of two windings which are located respectively adjacent the bottom of the slot and adjacent the mouth of the slot, the starting active coil side of each coil being located within a certain core slot and upon other active coil sides in said slot, the start lead of each coil emerging from the core substantially as near to the core periphery as the ending lead of the coil, and the starting and ending active coil sides of the inner coils occupying positions respectively alongside active coil side portions of the outer coils.

6. The method of manufacturing an armature having a plurality of coils wound into slots of an open-slotted core which includes winding a part of the total number of coils upon the core, in covering the overlapping parts of these coils at each end of the core with a portion only of a flexible nonconducting washer which is split from its outer periphery to its center hole, in winding an additional part of the total number of coils upon the core, in covering the overlapping parts of these additional coils at each end of the core with the remaining uncovered portion of the washer, and in winding the remainder of the coils upon the core.

7. An armature comprising a plurality of coils wound upon an open-slotted core, and an insulating flexible washer split from outer periphery to center hole located around the armature shaft adjacent an end of the core, a portion of the washer being located between the overlapping portions of a first series of coils and the overlapping portions of a second series of coils, and the remaining portion of the washer being located between the overlapping portions said second series of coils and the overlapping portions of a third series of coils.

In testimony whereof I hereto affix my signature.

FRED G. DEWEY.